(12) United States Patent
Vaccariello et al.

(10) Patent No.: US 11,521,434 B2
(45) Date of Patent: Dec. 6, 2022

(54) ANTENNA DETUNING PREVENTION FOR PHONE-AS-A-KEY VEHICLE SYSTEM

(71) Applicant: FORD GLOBAL TECHNOLOGIES, LLC, Dearborn, MI (US)

(72) Inventors: Andrew Vaccariello, Plymouth, MI (US); Vivekanandh Elangovan, Canton, MI (US); John R Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 269 days.

(21) Appl. No.: 16/939,172

(22) Filed: Jul. 27, 2020

(65) Prior Publication Data
US 2022/0028184 A1 Jan. 27, 2022

(51) Int. Cl.
| | | |
|---|---|---|
| G07C 5/00 | (2006.01) | |
| H01Q 1/24 | (2006.01) | |
| H01Q 3/26 | (2006.01) | |
| H01Q 21/29 | (2006.01) | |
| H04L 67/12 | (2022.01) | |
| H04W 4/80 | (2018.01) | |

(52) U.S. Cl.
CPC ............. *G07C 5/008* (2013.01); *H01Q 1/242* (2013.01); *H01Q 3/2605* (2013.01); *H01Q 21/29* (2013.01); *H04L 67/12* (2013.01); *H04W 4/80* (2018.02)

(58) Field of Classification Search
CPC ......... G07C 5/008; H04W 4/80; H01Q 1/242; H01Q 3/2605; H01Q 21/29; H04L 67/12
See application file for complete search history.

(56) References Cited

U.S. PATENT DOCUMENTS

| | | | |
|---|---|---|---|
| 9,515,378 B2 | 12/2016 | Prasad | |
| 9,894,492 B1 * | 2/2018 | Elangovan | .............. H04W 4/40 |
| 10,165,426 B1 * | 12/2018 | Jiang | ........................ H01Q 3/36 |
| 10,244,476 B2 | 3/2019 | Elangovan et al. | |

(Continued)

FOREIGN PATENT DOCUMENTS

WO    2012143936 A1    10/2012

OTHER PUBLICATIONS

Hur T, Bang J, Kim D, Banos O, Lee S—Smartphone Location-Independent Physical Activity Recognition Based on Transportation Natural Vibration Analysis. Sensors (Basel). 2017;17(4):931. Published Apr. 23, 2017. doi:10.3390/s17040931.

*Primary Examiner* — Chris Parry
*Assistant Examiner* — Hassan A Khan
(74) *Attorney, Agent, or Firm* — Frank L. Lollo; MacMillan, Sobanski & Todd LLC

(57) ABSTRACT

A Phone-as-a-Key (PaaK) system uses a handheld mobile device (e.g., a smartphone) to act as a remote-control system for a vehicle. The vehicle has a wireless receiver adapted to receive and relay a user message to a vehicle electronic controller. The handheld mobile device comprises a wireless transmitter with an antenna mounted at a predetermined antenna location in the mobile device, an input element activated manually by a user to initiate the user message to control the vehicle electronic controller, and a display panel. A processor in the mobile device is to configured to display a help screen on the display panel informing a user of a handholding grip adapted to avoid a blocking of the predetermined antenna location.

18 Claims, 6 Drawing Sheets

(56) References Cited

U.S. PATENT DOCUMENTS

| | | | |
|---|---|---|---|
| 10,414,376 B1* | 9/2019 | Ghannam | B60R 25/24 |
| 10,484,033 B1* | 11/2019 | Li | H04B 17/104 |
| 2013/0102367 A1* | 4/2013 | Kong | H04M 1/7246 |
| | | | 455/571 |
| 2013/0237272 A1* | 9/2013 | Prasad | H01Q 1/245 |
| | | | 342/372 |
| 2013/0281164 A1* | 10/2013 | Alameh | H04W 4/16 |
| | | | 455/566 |
| 2015/0373558 A1* | 12/2015 | Weisbrod | H04B 7/18504 |
| | | | 455/404.1 |
| 2015/0373749 A1* | 12/2015 | Palin | H04W 76/10 |
| | | | 455/41.2 |
| 2016/0300417 A1* | 10/2016 | Hatton | G07C 9/00857 |
| 2017/0263062 A1* | 9/2017 | Bergerhoff | H04L 9/0869 |
| 2017/0309098 A1* | 10/2017 | Watters | H04W 4/80 |
| 2018/0302859 A1* | 10/2018 | Elangovan | B60R 25/24 |
| 2018/0358991 A1* | 12/2018 | Kwok | H01Q 1/1257 |
| 2019/0070958 A1* | 3/2019 | Fogelklou | B60R 25/24 |
| 2019/0082475 A1* | 3/2019 | Haverinen | H04W 76/10 |
| 2019/0255893 A1* | 8/2019 | Van Wiemeersch | |
| | | | B60C 23/0479 |
| 2019/0261149 A1* | 8/2019 | Okumura | H04W 76/14 |
| 2019/0268461 A1* | 8/2019 | Ai | H04M 1/72454 |
| 2019/0308612 A1* | 10/2019 | Lavoie | B62D 15/0285 |
| 2020/0001822 A1* | 1/2020 | Han | G07C 9/00309 |
| 2020/0120509 A1* | 4/2020 | Stitt | H04W 12/122 |
| 2020/0269809 A1* | 8/2020 | Sanji | B60R 25/31 |
| 2021/0044927 A1* | 2/2021 | Jia | H04W 88/00 |
| 2021/0061225 A1* | 3/2021 | Ahmed | H04W 4/40 |
| 2021/0078534 A1* | 3/2021 | Stitt | H04W 68/02 |
| 2021/0243293 A1* | 8/2021 | Ökvist | H04W 24/02 |
| 2021/0264703 A1* | 8/2021 | Ahmed | H04W 4/02 |

* cited by examiner

ANTENNA DETUNING PREVENTION FOR PHONE-AS-A-KEY VEHICLE SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle remote-control systems using a mobile communication device such as a smartphone, and, more specifically, to guiding use of a mobile device in a way that provides a clear antenna path to optimize wireless signal reception.

Phone-as-a-key (PaaK) technology uses a wireless mobile device (e.g., cellular smartphone) to access vehicle functions that have been traditionally secured using a physical key or a dedicated wireless key fob. For PaaK, there may be a smartphone app that is downloaded and configured to direct secure communications with the vehicle to enable a user to access functions such as vehicle locking/unlocking, engine starting, courtesy lighting, and others. As used herein, "mobile device" refers to any wireless unit capable of remote control of a vehicle function, wherein the wireless unit is handheld and contains a display and a transmit/receive antenna. In addition to a smartphone, mobile devices may include, without limitation, a smart watch (such as an Apple® watch) and a dedicated vehicle key fob with display (also known as a display fob).

On the vehicle side, there may be several different electronic controllers handling the functions to be accessed by a PaaK system. Likewise, there may be one or more wireless receivers in the vehicle that would need to be accessible to the mobile device, wherein the wireless receivers may operate using several different wireless services, networks, or protocols. The types of wireless communication to be used by a PaaK system may include WiFi, Bluetooth® (e.g., Bluetooth Low Energy, or BLE), cellular, ultra-wideband (UWB), near-field communication (NFC), Wireless Charging (e.g., Qi), or others.

A typical smartphone device includes several wireless transceivers which often include cellular, WiFi, Bluetooth, NFC, and UWB transceivers integrated into a single device. Consequently, several different antennas or antenna arrays are likewise packaged within a mobile device. Although an antenna can sometimes be shared by transceivers using nearby frequency bands (such as WiFi and Bluetooth), it may typically be more desirable to space different antennas apart as much as possible. There may even be more than one antenna for a particular transceiver (known as diversity antennas) to allow a selection between two received signals in the event that one signal path experiences signal loss or distortion. Since available space in a handheld mobile device is limited, the various antennas may be installed at predetermined locations within the device that are not apparent to the user.

The user must hold their smartphone or other mobile device in their hand in order to interact with it via button presses to perform the desired functions. The human hand can possibly absorb and/or block a wireless signal that is either outgoing or incoming to the mobile device, thereby preventing or interfering with communication between the smartphone and the vehicle. This may lead a user to believe there is a problem with the smartphone, vehicle, or both, resulting in unnecessary maintenance appointments or frustration with the PaaK system.

SUMMARY OF THE INVENTION

The invention helps avoid hand absorption of wireless signals needed for communication with the vehicle, especially at long ranges. A warning/help system can be displayed on the display screen of the smartphone, alerting users that they may be blocking the transmission or reception of a signal from or to their smartphone depending on the orientation they are holding the phone in their hand. The alert can be accompanied by a vibration or a tone. The screen can display the proper way to hold the phone for both right- and left-handed users to ensure they get the most range and success out of their Phone-as-a-Key. The recommended grip/orientation to hold the phone will be based on which signal they are using to communicate with the vehicle (BLE, UWB, etc.) and the respective antenna position in the phone. To avoid unnecessary distractions, the alerting of the user can be contingent upon the actual signal reception. A Received Signal Strength Indication (RSSI) can be measured (either in the vehicle receiver or a different receiver in the smartphone). If the signal strength is weak (e.g., below a threshold), then the alert should be made to inform the user that their hand might be blocking the wireless signal. If the RSSI is above a threshold, then the alert can be inhibited since any signal blocking is not causing a problem.

In one aspect of the invention, a handheld mobile device such as a smartphone acts as a remote-control system for a vehicle. The vehicle has a wireless receiver adapted to receive and relay a user message to a vehicle electronic controller. The handheld mobile device comprises a wireless transmitter with an antenna mounted at a predetermined antenna location in the mobile device, an input element activated manually by a user to initiate the user message to control the vehicle electronic controller, and a display panel. A processor in the mobile device is configured to display a help screen on the display panel informing a user of a handholding grip adapted to avoid a blocking of the predetermined antenna location.

DETAILED DESCRIPTION OF PREFERRED EMBODIMENTS

A Phone-as-a Key system may include a smartphone, smartphone app, and vehicle systems as shown in U.S. Pat. No. 10,244,476B2, entitled "Reducing Power Consumption For Phone As A Key (PAAK) System," issued Mar. 26, 2019, which is incorporated herein in its entirety. The invention herein is applicable to any handheld mobile communication device used as a wireless remote-control device for a motor vehicle, wherein the mobile device has an internal antenna and a display panel for showing a help screen.

Figure 1:
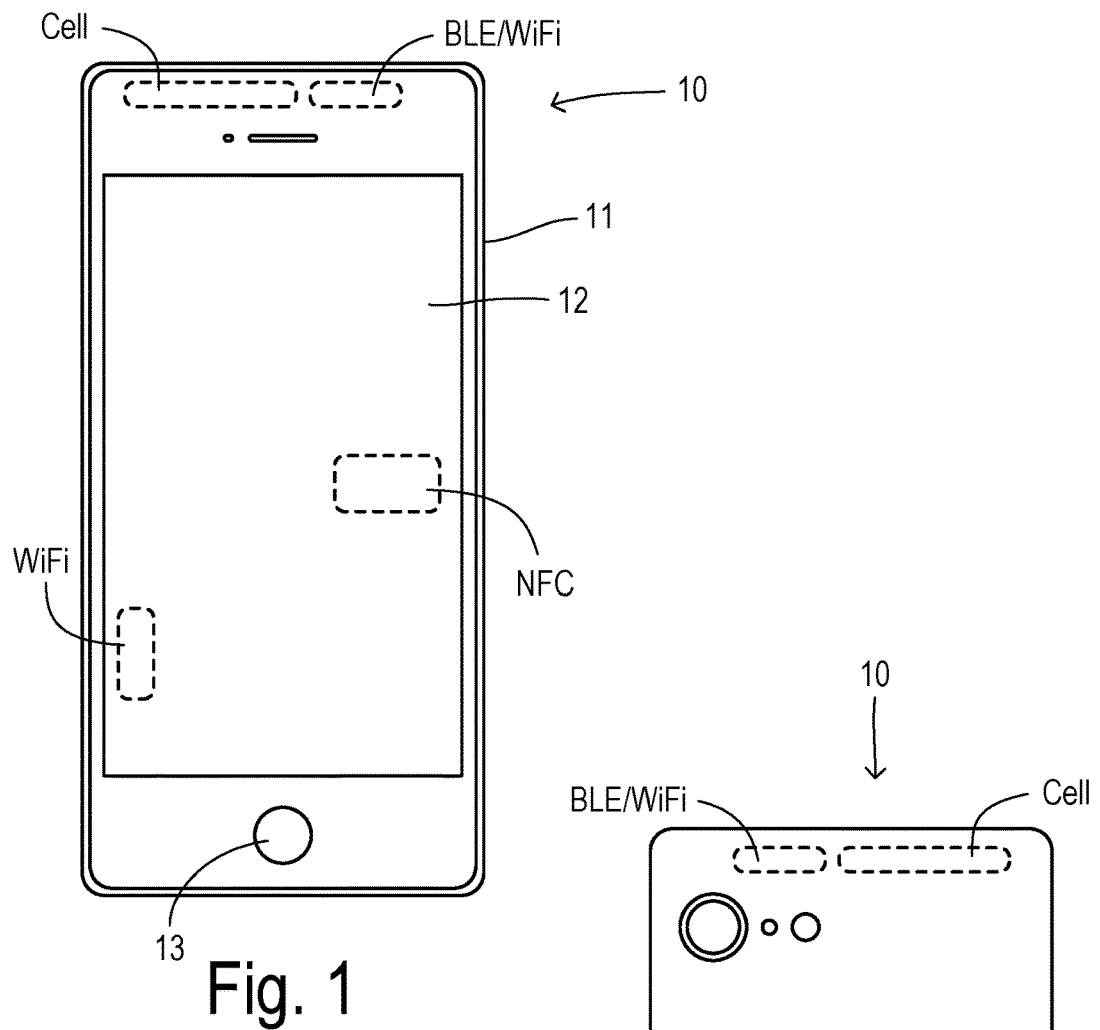
FIG. 1 is a front plan view of one embodiment of a smartphone showing some example antenna locations.
Figure 2:
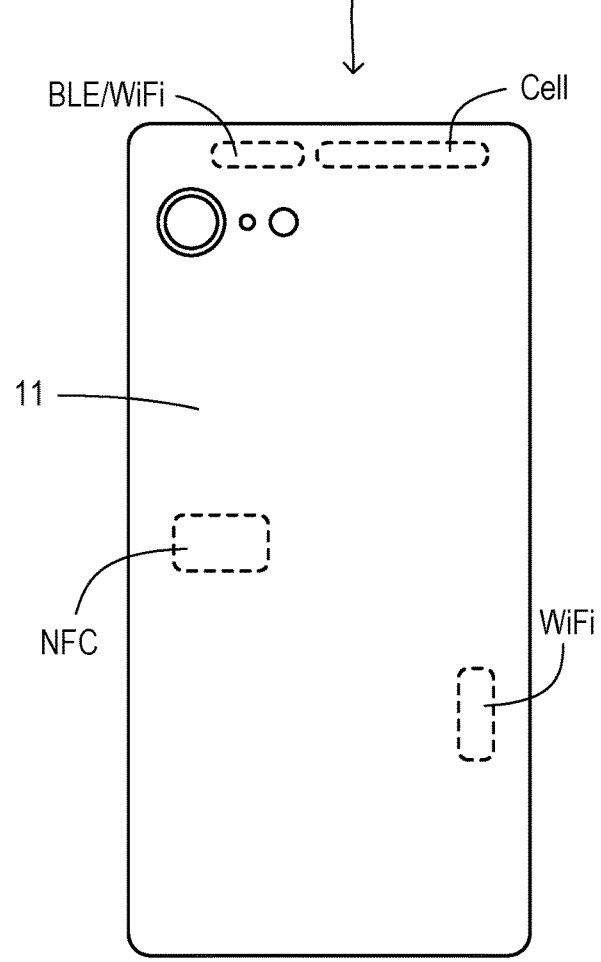
FIG. 2 is a rear plan view of the smartphone of FIG. 1.

FIGS. 1 and 2 show a smartphone 10 with an outer case or shell 11 and a touchscreen display assembly 12. Control buttons can be displayed on touchscreen display assembly 12 and are activated when a user places and/or presses a finger onto a corresponding control button. Smartphone 10 may include other manual switches or push buttons such as a home button 13. Other accessories in smartphone 10 can include a microphone and speakers for performing a phone call, a digital camera, light sensor, LED light source, and other components as known in the art.

Each model of any particular smartphone may have an internal construction that results in various types of antennas being installed at distinctive locations inside or on case 11. A user would typically have no information about where in their mobile device any particular type of antenna is located, or even which type of wireless communication (e.g., WiFi, Bluetooth, or NFC) is being used for any particular type of remote-control actions being taken. A few examples of predetermined antenna locations for smartphone 10 are shown by dashed outlines. Thus, a combined BLE/WiFi antenna may be located at an upper edge of smartphone 10 alongside a main cellular antenna. An NFC antenna is located near the vertical center and a diversity WiFi antenna midway between the center and a lower edge. Different hand grips on case 11 may block or attenuate different antennas.

Figure 3:
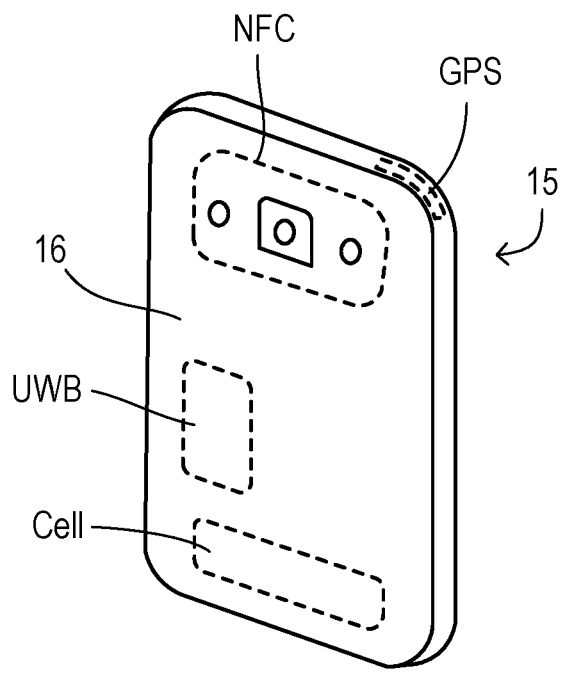
FIG. 3 is a rear perspective view of another embodiment of a smartphone showing some example antenna locations.
Figure 4:
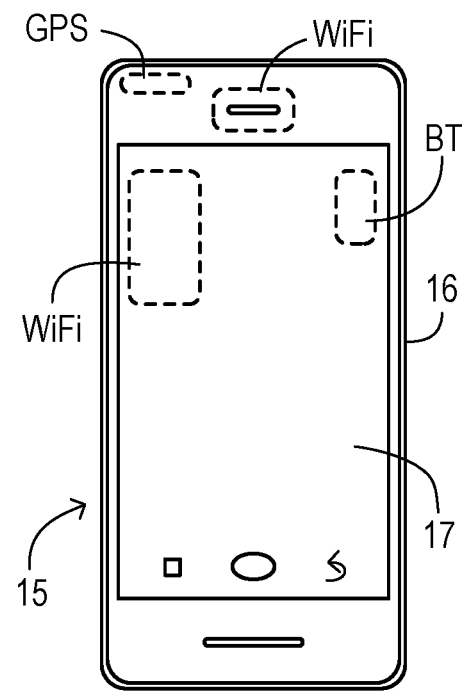
FIG. 4 is a front plan view of the smartphone of FIG. 3.

FIGS. 3 and 4 show another embodiment of a smartphone 15 with a case 16 and a touchscreen display panel assembly 17. FIG. 3 shows a rear side of smartphone 15 with antenna locations shown for an NFC antenna, a UWB antenna, and a main cellular antenna. FIG. 4 shows a front side of smartphone 15 with antenna locations shown for a GPS antenna, a WiFi antenna, and a Bluetooth antenna.

Figure 5:
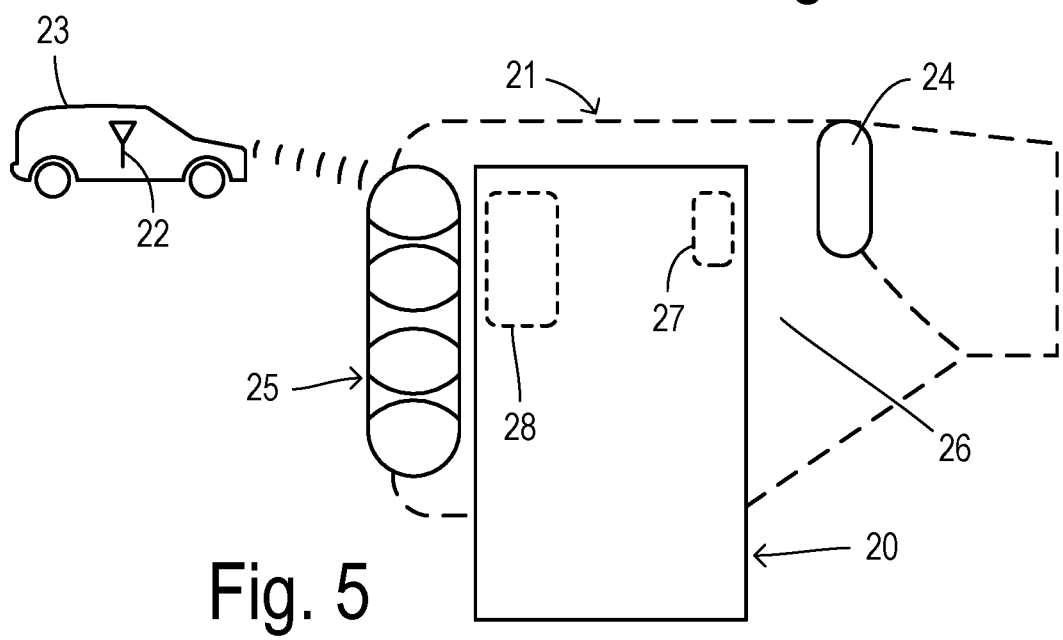
FIG. 5 is a diagram showing signal blocking (i.e. detuning) by a hand of a user while attempting wireless communication between a mobile device and a vehicle.

FIG. 5 shows a handheld mobile device 20 held in a hand 21 of a user while attempting to send a wireless message to an antenna 22 of a receiver in a vehicle 23. Device 20 is grasped in hand 21 with fingers 25 curled over one side edge of device 20 and a thumb 24 held against an opposite side edge so that most of the body of device 20 lies in a palm 26 of hand 21. Thus, a transmitted signal from a transmitting antenna such as a Bluetooth antenna 27 or a WiFi antenna 28 is at least partially blocked by some portion of hand 21, reducing the probability of being able to reliably receive the signal. Reception could be improved by altering the grip so that the transmitted signal does not pass through hand 21 in order to reach vehicle 23.

Figure 6:
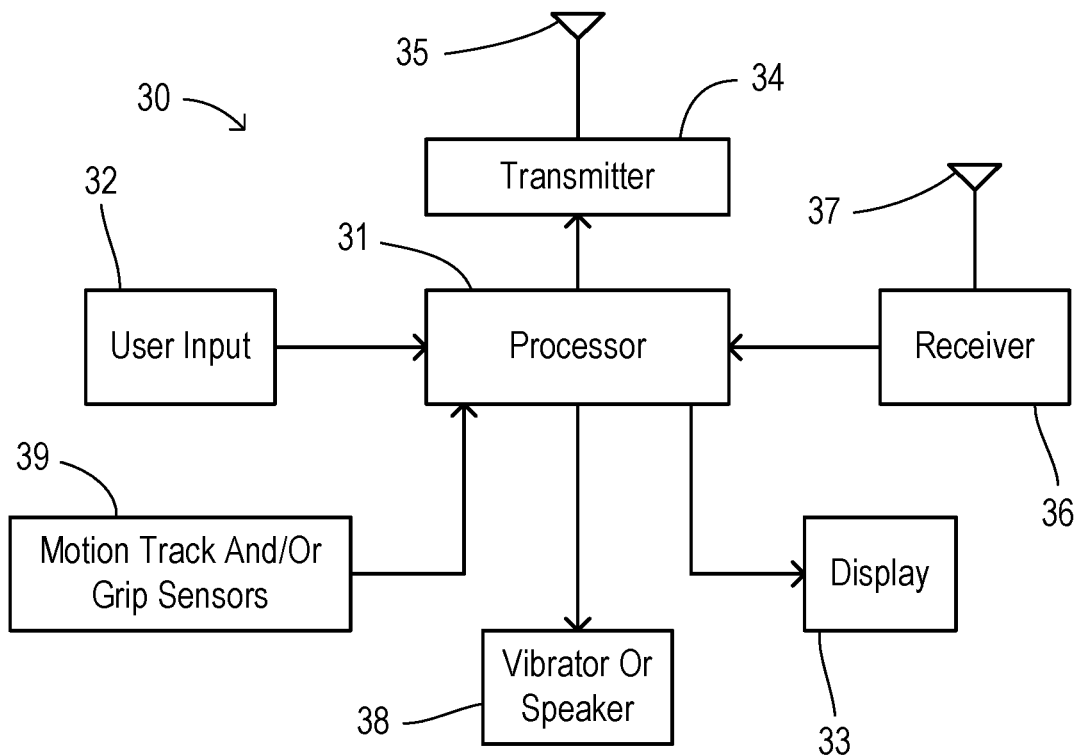
FIG. 6 is a block diagram of one embodiment of a mobile device according to the present invention.

FIG. 6 shows a general architecture of a handheld mobile device 30 (which may preferably be a smartphone) configured to provide alerts/recommendations to a user when engaged in PaaK functions to prevent device 30 from being held in a way that blocks an intended signal (i.e., detunes an antenna). A processor 31 is a programmable controller which provides services for basic operation of a mobile communication device and which can execute additional downloaded programs ("apps") such as a PaaK app. A user input 32 supplies user input signals to processor 31 to perform certain user actions. User input 32 may be comprised of a touchscreen. Mobile device 30 has a display panel 33 for display graphic images and/or text to a user in order to provide the alert/recommendation. A user may launch the PaaK app and then select a desired remote vehicle function by manually activating a corresponding button on the touchscreen so that the PaaK app initiates transmission of a user message via a transmitter 34 and antenna 35 to a vehicle receiver in order to control a corresponding vehicle electronic controller (such as a security system for unlocking a vehicle door or a powertrain control module for starting a vehicle engine). To obtain two-way wireless communication, mobile device 30 may include a receiving antenna 37 and a receiver 36 coupled to processor 31. To call the user's attention to an alert/help screen, an annunciator 38 such as a vibrator or speaker may be provided to generate mechanical vibrations (e.g., shaking or an audible tone) at the time that a help screen or other message is displayed on display panel 33. A sensor 39 such as a motion tracking system (e.g., accelerometer and/or gyrosensor) or a grip sensor (e.g., strain gauge) may be provided in order to detect a current grip and/or orientation in order to suppress an alert if it can be determined that a user is already holding/orienting mobile device 30 in an optimal way, as will be described later.

Figure 7:
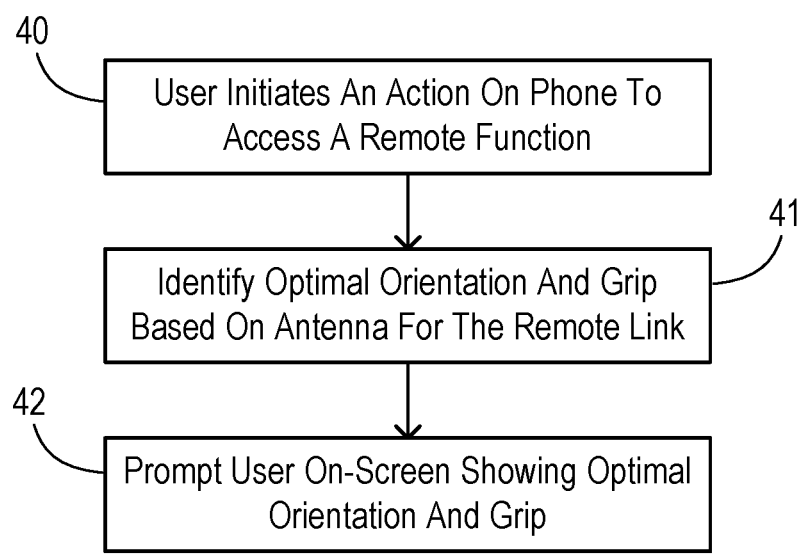
FIG. 7 is a flowchart showing one preferred embodiment of a method of the invention.

A general method of the invention is shown in FIG. 7 wherein a user initiates an action of the smartphone to access a remote vehicle function in step 40. The action can be any manipulation that triggers a PaaK controller (e.g., a processor executing a PaaK app) to generate a wireless user message to the vehicle. Depending upon the specific action being taken, a corresponding type of wireless transmission is initiated which uses an available communication channel of the smartphone (e.g., WiFi or Bluetooth). In step 41, the PaaK controller identifies an optimal handholding grip based on the location within the smartphone where the relevant transmitting antenna is installed. In the event that it is a significant factor (e.g., if the relevant antenna has a direction radiation pattern), then an optimal smartphone orientation may also be identified. The orientation may be given in reference to a relative location of the vehicle (e.g., pointing a particular portion of the smartphone toward the vehicle).

Once the recommended handholding grip(s) and orientation (if any) have been identified, the user is prompted with an on-screen display (i.e., help screen) showing the recommendation(s) in step 42. In response to the user action, the wireless transmitter is activated to send the user message. Generation of a help screen display can be either performed in advance of attempting to transmit the user message, in parallel with transmitting the user message, or after transmission. In some embodiments wherein the help screen may be inhibited if the message transmission occurs at a desired RSSI level, then the user message is sent first so that the RSSI measurement is enabled. On the other hand, if a user's grip can be sensed and is found not to be optimal, then the help screen could be shown before attempting to transmit the user message.

Figure 8:
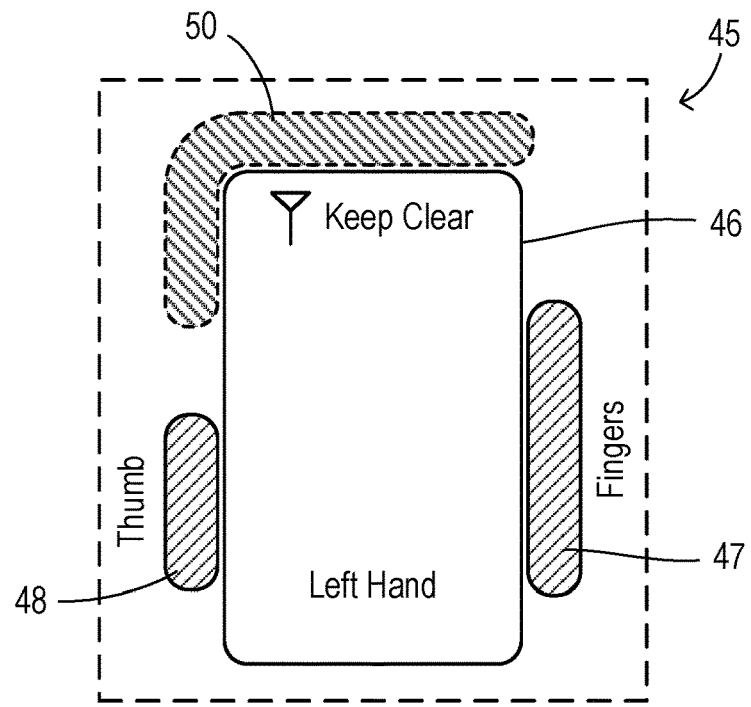
FIGS. 8 and 9 are depictions of embodiments of a help screen for grasping a smartphone in the left hand and right hand, respectively.
Figure 9:
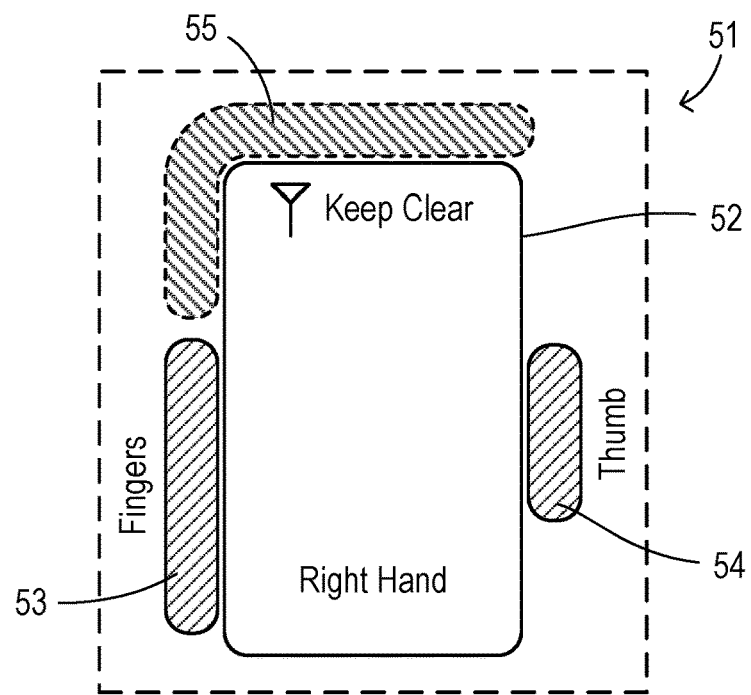

FIGS. 8 and 9 show embodiments of a help screen for holding a smartphone in the left hand and the right hand, respectively. The PaaK app can be configurable to select a preference for gripping in the left or the right hand, or both recommendations can be displayed, for example. In FIG. 8, a graphic depiction 45 of a grasping arrangement is shown for the left hand in association with a graphic representation 46 of the mobile device. The grasping arrangement includes a gripping area 47 for the fingers and a gripping area 48 for the thumb. In addition, or alternatively, an open area 50 is indicated which should be kept clear to avoid blocking the relevant antenna. Textual information may be included on the help screen to designate the antenna region to keep clear and the finger and thumb regions. Similarly, FIG. 9 has a graphic depiction 51 of a grasping arrangement for the right hand in association with a graphic representation 52 of the mobile device. The grasping arrangement includes a gripping area 53 for the fingers, a gripping area 54 for the thumb, and an open area 55 corresponding to the predetermined location of the antenna. An indication of the area corresponding to the location of the antenna which should remain open may be the most beneficial information to provide on the help screen since there are many different styles of holding a smartphone and tapping a touchscreen that any particular individuals may prefer to use (e.g., holding the smartphone in one hand and tapping the touchscreen with the thumb of the same hand).

Figure 10:
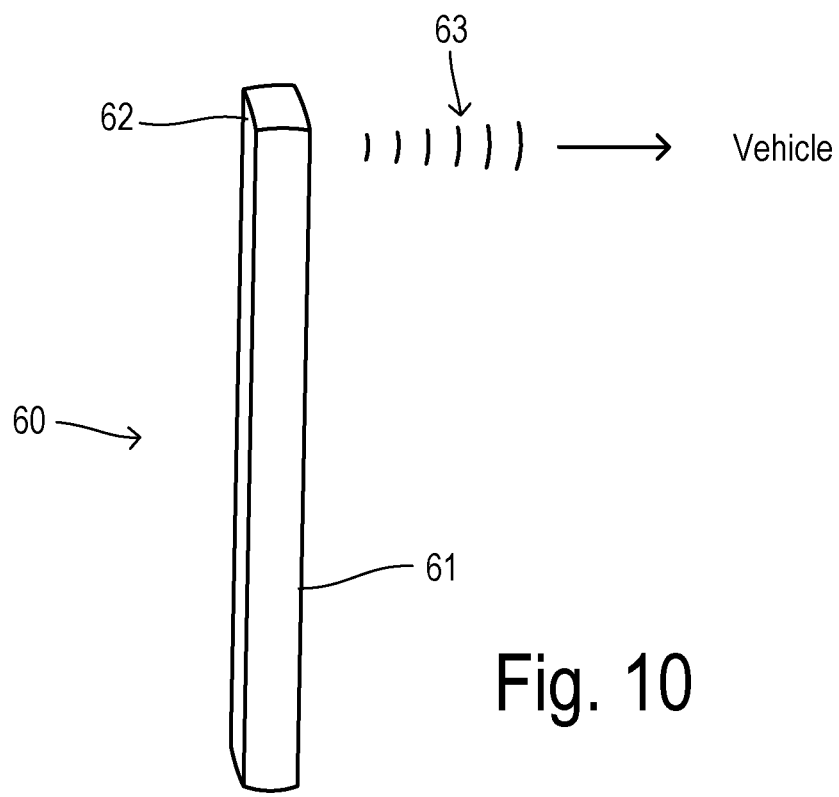
FIGS. 10 and 11 are depictions of help screens for showing a recommended orientation of holding a smartphone with respect to a vehicle.
Figure 11:
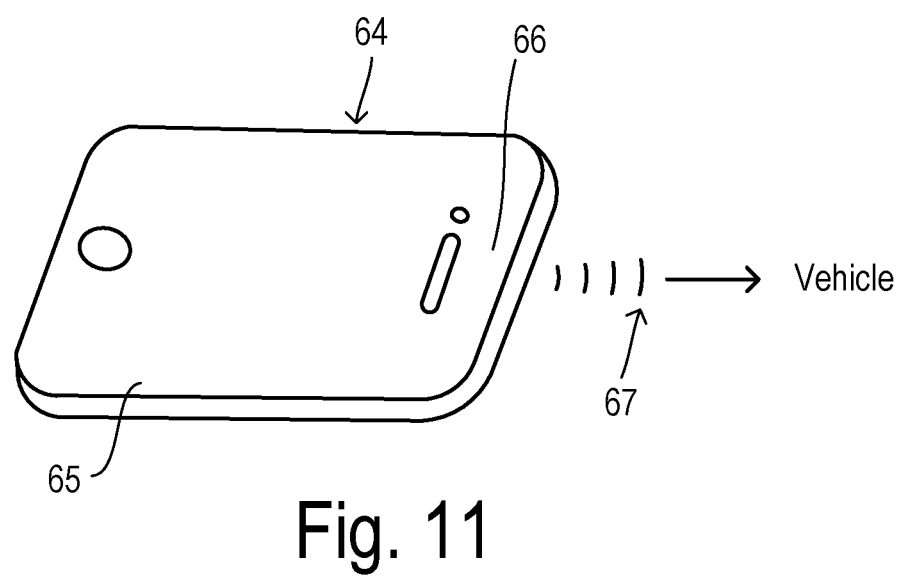

In addition to informing a user of a handholding grip adapted to avoid a blocking of the predetermined antenna location, some embodiments of the invention may include an indication on a help screen of a recommendation for orienting the mobile device with respect to the vehicle for optimizing a signal reception between the wireless transmitter and the wireless receiver. Although the antennas used in a handheld mobile device are typically omnidirectional, there may be instances where an antenna gain may be improved in a particular direction (e.g., at a longer distance from the vehicle or where elements of the mobile device itself near the antenna block a portion of the signal). FIG. 10 shows a help screen graphical depiction 60 of a handheld mobile device 61 wherein a relevant antenna is located in a region 62. Along with graphical representation 61 of the mobile device, a desirable transmission path 63 is indicated from antenna region 62 to the vehicle. Path 63 may include a directional arrow or a rendering of radio waves, for example. In the situation shown in FIG. 10, the mobile device is to be held vertically with a bottom side facing the vehicle. In FIG. 11, a help screen graphical depiction 64 of a handheld mobile device 65 with an antenna region 66 includes a desirable transmission path 67. In this example, the mobile device is to be held horizontally with a top edge facing the vehicle. The help screen elements of the type shown in FIGS. 10 and 11 could be shown with or without handholding grips as shown in FIGS. 8 and 9.

In some embodiments, a help screen may be generated showing a recommended grip/orientation whenever a remote-control signal is initiated by the user. In other embodiments, the display of a help screen (and its alert tone or vibration) may be inhibited in the event that it can be established that 1) the wireless signal is already receivable at a sufficient signal strength and/or 2) the mobile device is already held according to the recommended grip/orientation. The presence of a sufficient signal strength could be measured either by the vehicle or internally within the mobile device. The current grip and/or orientation could be measured using sensors such as a motion tracking device or pressure sensitive switches in the body of a smartphone or in an auxiliary case holding a smartphone.

Figure 12:
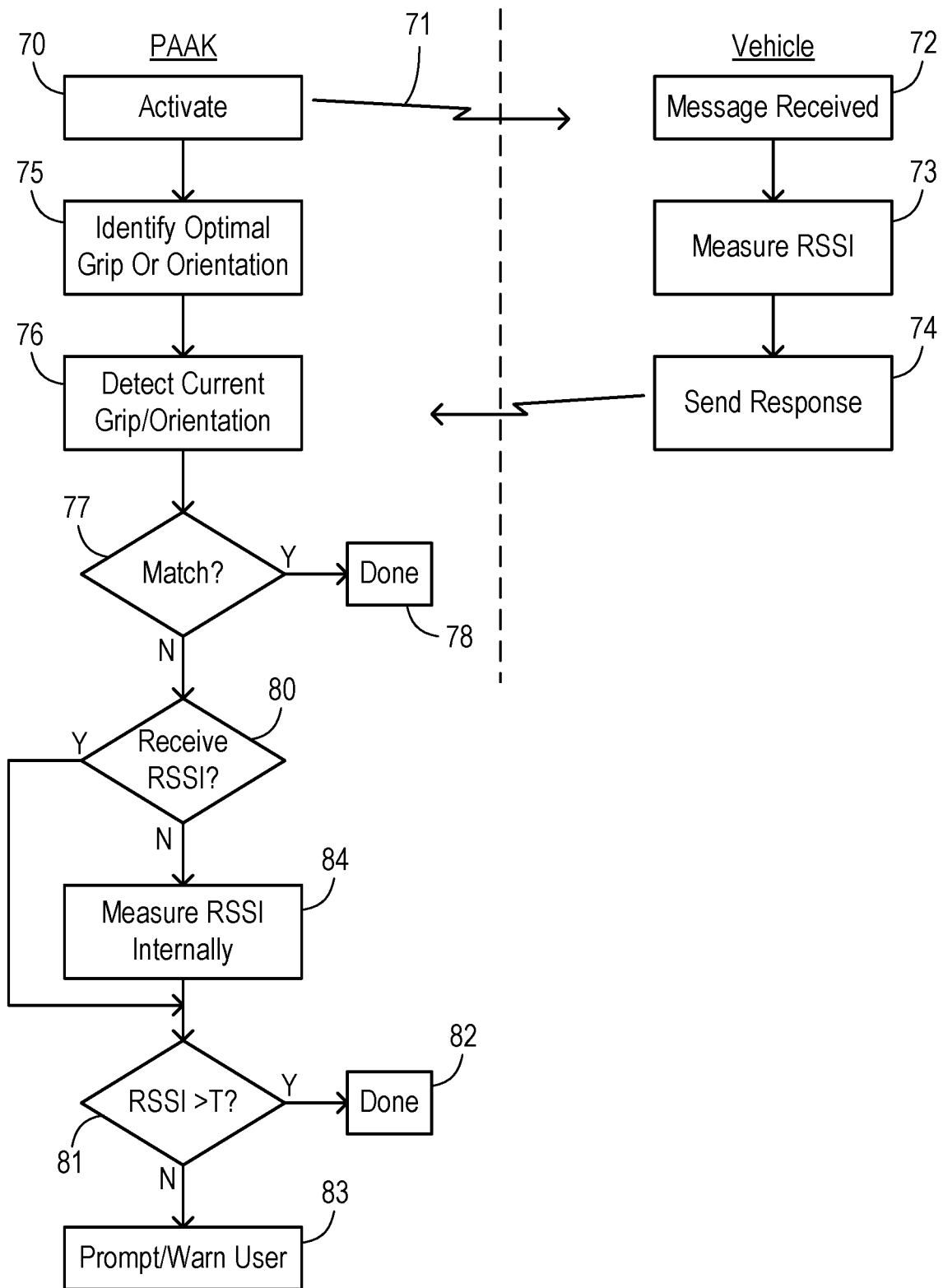
FIG. 12 is a flowchart showing another preferred embodiment of a method of the invention.

FIG. 12 shows one preferred method in which a help screen is suppressed when not needed. In step 70, a user initiates a user action (e.g., using a PaaK app) to manually activate wireless transmission of a user message to the vehicle from a wireless transmitter using an antenna mounted at a predetermined location in the mobile device. The user message may be immediately transmitted from the mobile device at 71. Within the vehicle, the user message is received at step 72. In step 73, a vehicle receiver measures an RSSI of the received wireless signal. In step 74, a vehicle transmitter sends a response message back to the mobile device including a data value corresponding to the RSSI or an indication whether the RSSI was above a predetermined threshold. If no user message was received or receivable, then no response message would be sent to the mobile device. During the time that might be required for the vehicle to receive and process a user message, the processor in the mobile device will have a waiting period without displaying a help screen to allow sufficient time to determine whether the help screen is needed.

After transmitting the first user message at 71, the controller in the mobile device identifies an optimal grasping arrangement (e.g., depiction of areas of the smartphone to be kept clear) and/or orientation in step 75. If equipped with the appropriate sensors, then a current grip and/or orientation can be detected in step 76. A check is performed in step 77 to determine whether the current grip/orientation matches the recommended grip/orientation. If they match, then the help method is terminated in step 78 (while the PaaK app may proceed as normally).

If no match is found in step 77 (or there are no grip/orientation sensors), then a check is performed in step 80 to determine whether a vehicle response message was received identifying a measured RSSI. In some embodiments, instead of a measured RSSI taken at the vehicle, the mobile device may itself measure an RSSI of any message transmitted from the vehicle to the mobile device over the antenna of interest. If yes, then a check is performed in step 81 to determine whether the RSSI is greater than a predetermined threshold. If yes, then the help method is terminated in step 82. If RSSI is not above the threshold, then a help screen (with or without a tone or vibration) is generated in step 83 to prompt/warn the user. Returning to the check in step 80, if a response message is not received then in some embodiments an RSSI measurement can be made internally within the mobile device. For example, it may be possible to receive the transmitted user message from one antenna in the mobile device via a second (i.e., different) antenna in the mobile device. A receiver connected to the second antenna could estimate an RSSI that would be seen at a vehicle based on known characteristics of the second antenna/receiver and an assumed distance to the vehicle (e.g., a maximum operating range). The second antenna/receiver could use the same wireless service if the hardware is available on the smartphone. A different wireless service (e.g., receiving a BLE signal with a WiFi antenna) could be used if the frequency spectra are sufficiently close or overlapping.

A more detailed example of measuring the RSSI at the vehicle is as follows. When the user presses a remote command (e.g., lock, unlock, etc.), a BLE message is sent from the smartphone. While doing that, the smartphone also sends Time of Flight information to the vehicle (either through the same BLE or a different wireless channel such as UWB or Wi-Fi). The vehicle records the time taken for the signal to be received. Based on the time, an approximate distance between the vehicle and the user with smartphone is estimated. An estimate of an expected RSSI based on that distance is determined, assuming there is no signal blockage by the hand of the user. If the actual measured RSSI is less than the expected RSSI by a predetermined amount, then the help screen is displayed to the user.

Since PaaK may use a common app (e.g., an Android or iOS app which may be stored as non-transitory computer readable media and downloaded into a mobile device), and since it would be inconvenient to store configuration data (e.g., mobile device layout, antenna locations, and recommended grips) regarding every possible model of mobile device within the PaaK app (e.g., there are about 300 phones in the field at any given time), a cloud-based database may preferably be maintained from which the common PaaK app can pull (e.g., download from a cloud-based server) configuration data for the phone model being used.

A PaaK app may further enable gathering of anonymous data to improve wireless performance. For example, detected attenuation events that triggered the PaaK app to display instructions to grip and/or orient the wireless device differently (i.e., a coaching event) could be logged in a cloud database. The resulting data could be analyzed to identify mobile devices that may have particularly problematic performance. Logged data could include whether attenuation events are triggered for left-handed use or right-handed use. It could be helpful to also log what other phone features were active at the time of the detected de-tuning event. Collected data could answer questions such as was the Bluetooth transceiver performing classic streaming, was the BLE function active for some other purpose in addition to PaaK, was a smartphone on an active cellular call, or was the mobile device in a WiFi hot spot transmitter mode, for example.

If a coaching event occurs (or recurs a certain number of times), the user could be prompted by the PaaK app to identify the model of their phone case or other data that could impact transmission performance. The data could also be tracked in the cloud database. Analysis of such data on field performance could lead to pre-emptively pushing notifications regarding problematic devices (e.g., smartphones) when the PaaK app is first installed on such a device to alert the user.

What is claimed is:

1. A remote-control system for a vehicle, comprising
a wireless receiver installed in the vehicle and adapted to receive and relay a user message to a vehicle electronic controller; and
a handheld mobile device comprising:
a wireless transmitter with an antenna mounted at a predetermined antenna location in the mobile device, wherein the wireless receiver in the vehicle includes an RSSI circuit configured to measure a received signal strength of a wireless signal from the antenna;
an input element activated manually by a user to initiate the user message to control the vehicle electronic controller;
a display panel; and
a processor configured to display a help screen on the display panel informing a user of a handholding grip adapted to avoid a blocking of the predetermined antenna location, wherein the wireless receiver in the vehicle transmits a vehicle response message to the wireless transmitter identifying the measured received signal strength, wherein the processor inhibits display of the help screen when the received signal strength is greater than a predetermined threshold.

2. The remote-control system of claim 1 wherein the mobile device is comprised of a smartphone wherein the display panel is included in a touchscreen assembly.

3. The remote-control system of claim 1 wherein the mobile device includes a plurality of wireless transmitters each adapted to communicate with a respective receiver in the vehicle, wherein the processor identifies a relevant transmitter according to the user message being activated, and wherein the processor selects a respective help screen according to the relevant transmitter being identified.

4. The remote-control system of claim 1 wherein the help screen is comprised of a graphic depiction of a grasping arrangement in association with a graphic representation of the mobile device.

5. The remote-control system of claim 1 wherein the help screen is comprised of textual information.

6. The remote-control system of claim 1 wherein display of the help screen is accompanied by a mechanical vibration of the mobile device.

7. The remote-control system of claim 1 wherein the help screen further comprises a recommendation for orienting the mobile device with respect to the vehicle for optimizing a signal reception between the wireless transmitter and the wireless receiver.

8. The remote-control system of claim 7 wherein the mobile device further comprises a motion tracker for detecting an actual orientation of the mobile device, and wherein the recommendation for orienting the mobile device is inhibited if the actual orientation matches the recommendation for orienting the mobile device.

9. The remote-control system of claim 1 wherein the vehicle response message identifying the measured received signal strength is comprised of an RSSI data value.

10. The remote-control system of claim 1 wherein the vehicle response message identifying the measured received signal strength is comprised of an indication whether the received signal strength is greater than the predetermined threshold.

11. The remote-control system of claim 1 wherein the wireless transmitter sends Time of Flight information to the wireless receiver when sending the user message, wherein the wireless receiver determines an expected received signal strength according to a distance based on the Time of Flight information, and wherein the predetermined threshold is a predetermined amount less than the expected received signal strength.

12. A method for guiding use of a mobile device as a remote controller in wireless communication with a vehicle, comprising the steps of:
receiving a user action on the mobile device to manually activate wireless transmission of a user message to the vehicle from a wireless transmitter using an antenna mounted at a predetermined location in the mobile device;
transmitting the user message via the antenna;
receiving the user message at a wireless receiver installed in the vehicle, wherein the wireless receiver is adapted to relay the user message to a vehicle electronic controller;
evaluating a received signal strength of the user message at the wireless receiver;
transmitting a vehicle response message from the wireless receiver in the vehicle to the wireless transmitter in the mobile device identifying the measured received signal strength;
displaying a help screen on a display panel of the mobile device informing a user of a recommended handholding grip adapted to avoid a blocking of the predetermined antenna location, wherein display of the help screen is inhibited when the received signal strength is greater than a predetermined threshold.

13. The method of claim 12 wherein the mobile device includes a plurality of wireless transmitters with respective antennas at respective predetermined antenna locations each adapted to communicate with a respective receiver in the vehicle, the method further comprising the steps of:

identifying a relevant transmitter according to the user action; and selecting a respective help screen according to the identified relevant transmitter so that a relevant antenna location is unblocked by the recommended handholding grip.

14. The method of claim 12 wherein the help screen is comprised of a graphic depiction of a grasping arrangement in association with a graphic representation of the mobile device.

15. The method of claim 12 further comprising the step of mechanically vibrating the mobile device when display of the help screen is initiated.

16. The method of claim 12 wherein the help screen further comprises a recommendation for orienting the mobile device with respect to the vehicle for optimizing a reception of the user message.

17. The method of claim 16 further comprising the step of motion tracking the mobile device to detect an actual orientation of the mobile device, wherein the recommendation for orienting the mobile device is inhibited if the actual orientation matches the recommendation for orienting the mobile device.

18. The method of claim 12 further comprising the steps of:

sending Time of Flight information from the wireless transmitter to the wireless receiver when sending the user message; and the wireless receiver determining an expected received signal strength according to a distance based on the Time of Flight information;

wherein the predetermined threshold is a predetermined amount less than the expected received signal strength.

* * * * *